UNITED STATES PATENT OFFICE.

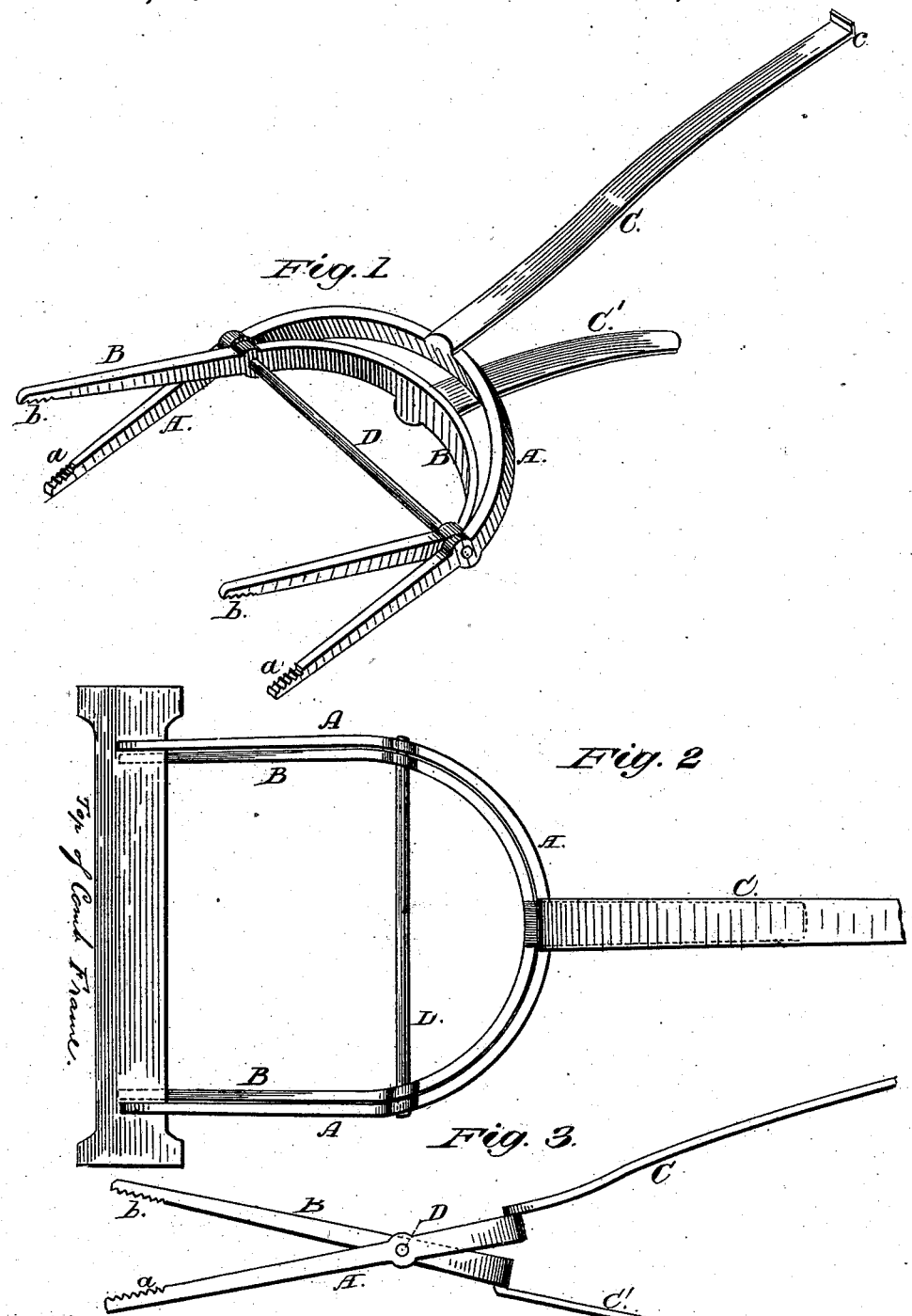

ANDREAS HANSEN, OF DES MOINES, IOWA.

COMB-FRAME TONGS.

SPECIFICATION forming part of Letters Patent No. 225,519, dated March 16, 1880.

Application filed August 23, 1879.

*To all whom it may concern:*

Be it known that I, ANDREAS HANSEN, of Des Moines, in the county of Polk and State of Iowa, have invented certain new and useful Improvements in Comb-Frame Tongs; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view, showing the tongs open. Fig. 2 is a plan view; and Fig. 3 is a side elevation.

Similar letters of reference indicate corresponding parts in all the figures.

This invention relates to devices for removing the comb-frames, when filled with honey, from the bee-hive; and it consists in the construction and arrangement of a pair of tongs adapted for this purpose, substantially as hereinafter described, and particularly pointed out in the claim.

In the drawings, A is the upper, and B the lower, jaw of a pair of tongs, each of which consists of a handle (denoted by C and C′, respectively) and a forked jaw, as shown. The handle C′ of the lower or inner jaw is shorter than C, and the upper or outer jaw, A, is provided with a brace or cross-piece, D, upon which the arms of the forked inner jaw are pivoted, so that when closed or folded the jaw B will lie inside of and impinge upon the parallel outer jaw, A, as shown more clearly in Fig. 2. The points of the outer jaw, A, are serrated on their upper side, as shown at *a a*, and the points of the inner jaw are serrated in like manner upon their under side, as shown at *b b*. This enables the jaws A B to obtain a firm gripe on the comb-frame to be withdrawn from the hive at its two upper corners, so that it may be readily removed from the hive and, if desired, reinserted into another hive. The long arm C is provided at its end with a sharp wedge or tooth, *c*, by the aid of which the frame to be removed may be loosened from the walls of the house or hive, to which it will naturally adhere.

By the use of these tongs the difficult operation of changing or removing the comb-frames in a bee-hive is greatly facilitated without danger of breaking the comb or having the hands stung by the bees.

I prefer to make the full-size tongs of iron, about seventeen inches long and eight and one-half inches wide, which adapts them for comb-frames of the style and size most generally in use.

Having thus described my invention, I claim and desire to secure by Letters Patent of the United States—

The comb-frame tongs substantially as described—viz., as provided with the shanks C C′, bifurcated and pointed jaws A B, working one within the other, and pivot-bar D, constructed and combined as set forth—as an article of manufacture.

In testimony that I claim the foregoing as my own I have hereunto affixed my signature in presence of two witnesses.

ANDREAS HANSEN.

Witnesses:
CHRIST. NELSON,
HANS W. HANSEN.